Aug. 30, 1938.  K. A. A. JOHANSON  2,128,707
APPARATUS FOR CALCULATING TICKET PRICES
Filed June 17, 1936
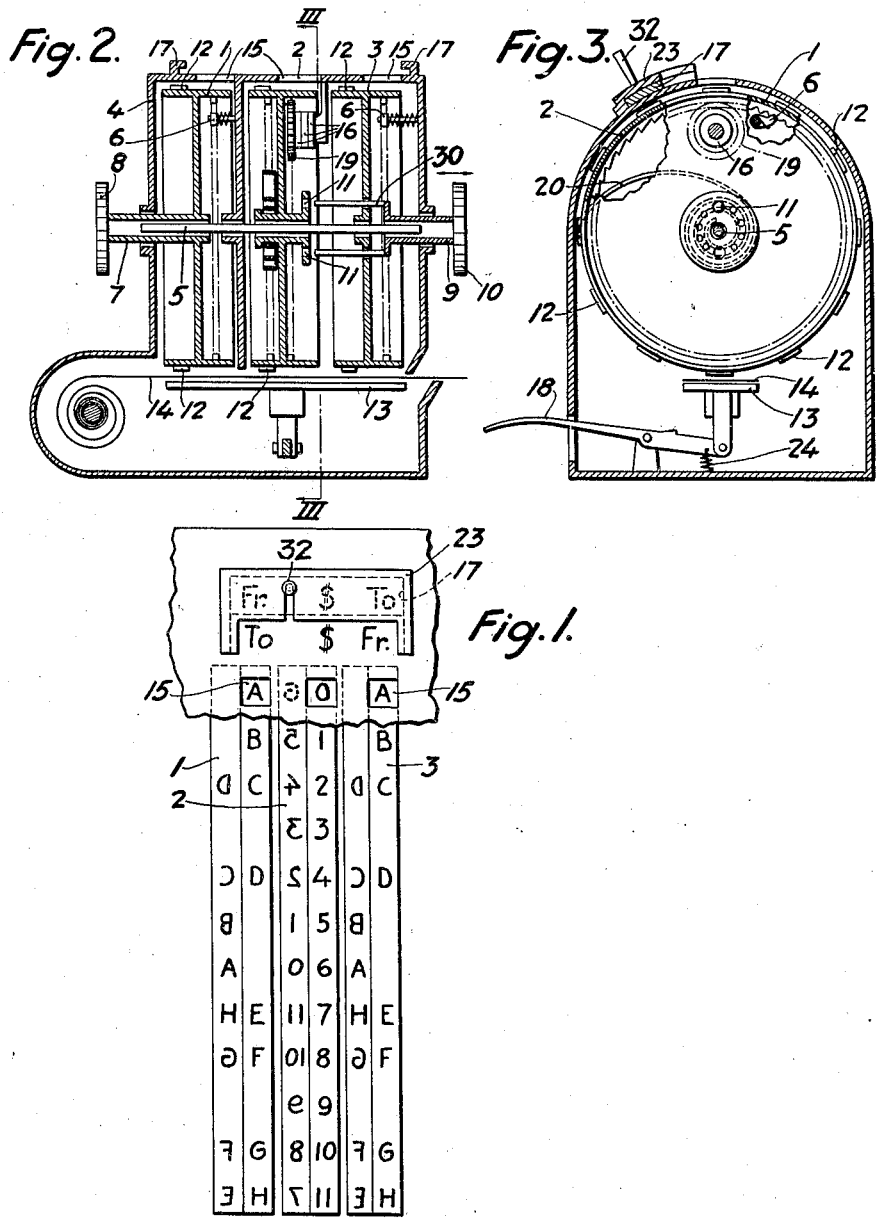
Inventor.
Karl Albin Abraham Johanson
by Heard Smith & Tennant.
Attys.

Patented Aug. 30, 1938

2,128,707

UNITED STATES PATENT OFFICE 2,128,707

APPARATUS FOR CALCULATING TICKET PRICES

Karl Albin Abraham Johanson, Stockholm, Sweden

Application June 17, 1936, Serial No. 85,677
In Sweden September 19, 1935

1 Claim. (Cl. 235—31)

This invention relates to a very simple and practical apparatus intended particularly for calculating ticket prices between various stations on a railway or other public conveyance. The apparatus may conveniently be used whenever the ticket prices vary between various stations, and it furnishes a simple device for quickly indicating the price of the ticket between any two stations on the transportation system.

An apparatus embodying the invention comprises at least three indicators which are adjustable relatively to each other, one of which indicators is in the nature of a price indicator and the others of which are in the nature of station indicators. These indicators are mounted in a suitable casing provided with sight openings through which the indication on the indicators may be read. The price indicator is provided with numeral indices representing price units and which are uniformly spaced thereon and which form an arithmetical series beginning with zero. The station indicators are duplicates of each other and are provided with references which may indicate the various stations of the transportation system. The references on each station indicator are so spaced or disposed that the space between any two references corresponds to a multiple of the space between adjacent indices on the price indicator.

In using the device one of the station indicators is adjusted into a position to indicate through the sight opening the station at one end of the proposed journey for which the ticket is to be sold, and then the other station indicator is similarly adjusted so that both indicators will then indicate the station at said end of the journey. The second indicator is then coupled to the price indicator (which normally indicates zero) and is adjusted to bring the indication thereon which represents the station at the other end of the journey into position to be seen through the sight opening and because the price indicator is coupled to the second station indicator, said price indicator will be moved simultaneously with the second station indicator. The reading of the price indicator when thus adjusted will give the price of the ticket between the two stations represented by the readings of the two station indicators as thus adjusted.

The device is shown as equipped with a printing attachment by which a ticket may be printed bearing the names of the stations from which the journey started and the names of the stations at which it ended and also the price of the ticket for this journey.

An embodiment of the invention is illustrated in the accompanying drawing in which:

Fig. 1 is a diagram of the indicators, and
Fig. 2 is a vertical section of the apparatus.
Fig. 3 is a section on line III—III of Fig. 2.

The indicators in the form shown consist of rotatably mounted rolls, which rolls, as well as part of the casing of the apparatus, are shown developed or laid out flat in a common plane in Fig. 1 for illustrative purposes. In one convenient practical form of construction as illustrated in Fig. 2, the indicators consist of rotatably mounted rolls 1, 2 and 3. The rolls 1 and 3 are provided with the references A—H which are supposed to indicate station names and will therefore be referred to hereinafter as station indicators. The price-indicating roll 2, which is located between the station indicators is provided with numeral indices forming an arithmetical series beginning with zero.

In this case the difference between the successive figures of the numerical series is "one", and the figures are located at equal distances from one another. The references on the station indicators 1 and 3 have a spacing corresponding to the ticket prices between the several stations as expressed in multiples of the price unit, that is, the price of the tickets for the shortest journey. In other words, if any two adjacent stations are so close together that the price ticket between them is only one price unit then the indices representing said stations on the station indicators will have the same spacing as the indices on the price indicator, but if the distance between any two stations is such that the price of the ticket between such stations is, for instance, three times that of the short journey then the indices representing said stations will be spaced apart on the station indicators a distance three times that of the space between two stations' indices representing the shortest journey.

Thus, according to the illustrated embodiment of the invention, if the price difference between the stations indicated by A and B is one crown or one price unit, then the A and B indices on the station indicators will be spaced apart the same distance as the numeral indices on the price unit, but if the price for a ticket between stations indicated by D and E, for instance, is three price units or three crowns, then the D and E indices on the station indicators will be spaced apart three times the distance between the A and B indices.

The rolls 1, 2 and 3 are rotatably mounted on a shaft 5 located in a casing 4. The station-indicating rolls 1 and 3 are adapted to be retained in their set positions by spring-actuated pawls or detents 6. The station indicator 1 is connected with a sleeve 7 provided with an operating device 8, by means of which sleeve the indicator in question may be adjusted. The other station indicator 3 is adjusted by means of a sleeve 9 which is rotatably and slidably mounted on the shaft 5, said sleeve having forked or pronged extensions 30 which extend through openings in the indicator 3 and being provided with a thumb piece 10 by which it may be rotated.

When the sleeve 9 is in its retracted position shown in the drawing, only the station indicator 3 is actuated when the operating device 10 is rotated. However, if the sleeve 9 is moved inwards so that its forked end engages recesses 11 on the hub portion of the roll 2, the price indicator is also carried along when the station indicator 3 is rotated.

In the embodiment shown each indicator is provided with type characters 12 corresponding to the indices and the references respectively of the indicators, and by means of a printing platen 13 located in the casing 4 and adapted to be actuated by a key 18 the required or calculated ticket price together with station references may be transferred to a tear-off paper strip 14. As the printing platen in this case is provided on that side of the rolls 1, 2 and 3 which is diametrically opposite to the side from which the references and indices may be read off through openings 15 made in the casing 4, the types must be located in accordance with Figure 1 in order to obtain a print corresponding to the visible adjustment.

In the present apparatus it is also possible to sum up in a result totalizer the amount received from all the tickets sold. In this case there is preferably provided a totalizer of known construction, the calculating wheels 16 of which are driven through a one-way driving connection by a toothed wheel 19 in mesh with the price indicator 2, which toothed wheel drives the totalizer and transfers to the same the amount corresponding to the setting of the price indicator whenever the price indicator is returned to zero position. A spiral spring 20 tends to automatically return the indicator 2 to the zero position when the extensions on the sleeve 9 have been withdrawn from the apertures 11.

In this way it will be possible to obtain a check on the number of the tickets sold. By a special control strip to which the ticket prices are transferred at the same time as they are transferred to the ticket strip, it is, of course also possible to obtain a check on the ticket selling either without, or simultaneously with, the use of a result totalizer.

The casing 4 carries the notations "To" and "Fr." (abbreviation for "from") adjacent the openings 15 for the station indicators. Adjacent this notation is a cover plate 23 which normally covers or encloses a slide 17 also provided with the notations "To" and "Fr." but in the reverse position from that in which they appear on the casing. This slide 17 can be moved by means of a knob 32 out from under the cover plate 23 so as to cover the notations "To" and "Fr." on the casing.

For a journey in one direction the slide will be concealed under the cover plate 23 as shown in the drawing, in which case the indicator 1 will indicate the station to which the journey is made and the indicator 3 will indicate the station from which the journey started. If the journey is in the reverse direction then the slide 17 is withdrawn from under the cover plate, in which case the indicator 1 will indicate the station from which the journey started and the indicator 3 will indicate the station at which the journey ends.

The apparatus is operated in the following manner:

If a journey is made in the direction A to H and it is desired to calculate the price of the ticket for a journey from the station indicated by D to the station indicated by F, the slide 17 is moved out from under the cover plate 23 by means of the knob 32 so that it covers up the notation "To $ Fr." on the casing and brings into view the notation "Fr. $ To" on the slide 17 with the abbreviation "Fr." over the indicator 1 and the word "To" over the indicator 3. The station indicator 1 is then so set that the reference D is visible through one opening 15, thereby indicating the station from which the journey is to start. The price indicator 2, which has been zeroized after its last setting, shows the figure 0. By means of the operating device 10 the station indicator 3 is turned so that the reference D thereon may be read through its opening 15. The indicators 2 and 3 are then engaged with one another by moving the sleeve 9 inwardly thereby to cause the projections 30 to enter openings 11 in the hub of the price indicator 2, thereby coupling the station indicator 3 to the price indicator 2. When the indicator 3 is now turned so that the reference F becomes visible through the sight opening 15, thus indicating the station at the end of the journey, the numeral indicator will show the figure 4 which thus indicates the required ticket price. If it is desired to print a ticket for the journey between stations D and F the operator will actuate the lever 18 after having first made the ticket price calculation as above described, thereby printing on the strip 14 the names of the two stations representing the beginning and ending of the journey with the price of the ticket between the stations.

The apparatus may also be used to calculate the price of a ticket between two stations where the journey is in the opposite direction, that is, in a direction proceeding from station H to station A. In thus using the apparatus the slide 17 is moved back into position underneath the cover plate 23 as indicated in the drawing so that the indicator 1 will indicate the station to which the journey is to proceed, and the indicator 3 will indicate the station from which the journey started. If the journey, for instance, is from station F to station C, then the station indicator 1 will first be adjusted to indicate station C, that is, the station of destination. The station indicator 3 is then adjusted to bring the reference C into view in its sight opening 15, and then the station indicator 3 is coupled to the price indicator by moving the sleeve 9 inwardly and said station indicator 3 is then turned to bring the station F into view beneath the sight opening 15. The reading on the price indicator then shows the price of the ticket between the stations F and C.

Several different embodiments are, of course, possible within the scope of the invention, and particularly the necessary motion transmission means may be varied in a great many ways without departing from the idea forming the basis of the invention.

Having now described my invention, what I claim as new and desire to secure by Letters Patent is:

A device for calculating ticket prices comprising a plurality of coaxial rotary indicators, one of which constitutes a station indicator and has station-indicating indices thereon and another of which constitutes a price indicator and has price-indicating indices thereon, a rotary operating member situated coaxial with said indicators and movable in the direction of its axis, said member having at its inner end a forked portion, the arms of which extend through apertures in and project beyond said station indicator, said price indicator having a hub portion provided with apertures to receive said arms when the operating member is moved axially whereby the price indicator is coupled to the station indicator, a spring acting on the price indicator and tending at all times to return it to zero position, and a spring-actuated detent acting on the station indicator and operating to hold it as well as the price indicator when the latter is coupled thereto in any position in which they may be set.

KARL ALBIN ABRAHAM JOHANSON.